United States Patent
Gibson et al.

(10) Patent No.: US 9,416,742 B2
(45) Date of Patent: Aug. 16, 2016

(54) METHOD FOR STARTING AN ENGINE

(75) Inventors: Alex O'Connor Gibson, Ann Arbor, MI (US); Joseph Norman Ulrey, Dearborn, MI (US); John Eric Rollinger, Sterling Heights, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1049 days.

(21) Appl. No.: 12/707,564

(22) Filed: Feb. 17, 2010

(65) Prior Publication Data

US 2011/0137543 A1    Jun. 9, 2011

(51) Int. Cl.
| | |
|---|---|
| *F02D 41/00* | (2006.01) |
| *F02D 41/06* | (2006.01) |
| *F02D 41/30* | (2006.01) |
| *F02D 41/40* | (2006.01) |
| *F02N 11/08* | (2006.01) |

(52) U.S. Cl.
CPC .......... *F02D 41/0087* (2013.01); *F02D 41/065* (2013.01); *F02D 41/3076* (2013.01); *F02D 41/402* (2013.01); *F02D 2200/0406* (2013.01); *F02N 11/0814* (2013.01); *Y02T 10/44* (2013.01)

(58) Field of Classification Search
USPC .................................................... 123/179.16
See application file for complete search history.

(56) References Cited

U.S. PATENT DOCUMENTS

| | | | |
|---|---|---|---|
| 4,007,590 A | 2/1977 | Nagai et al. | |
| 4,577,599 A * | 3/1986 | Chmielewski | 123/179.2 |
| 5,778,855 A * | 7/1998 | Czekala et al. | 123/406.27 |
| 5,979,157 A * | 11/1999 | Kinugasa et al. | 60/274 |
| 6,257,207 B1 | 7/2001 | Inui et al. | |
| 6,478,007 B2 | 11/2002 | Miyashita et al. | |
| 6,615,785 B2 | 9/2003 | Weiss | |
| 6,634,166 B2 | 10/2003 | Miyashita | |
| 6,881,170 B2 * | 4/2005 | Onoyama et al. | 477/39 |
| 6,910,457 B2 | 6/2005 | Grieser et al. | |
| 6,951,525 B2 | 10/2005 | Ries-Mueller | |
| 7,079,941 B2 * | 7/2006 | Tetsuno et al. | 701/112 |
| 7,287,500 B2 | 10/2007 | Izumi et al. | |
| 7,472,016 B2 * | 12/2008 | Takeyama et al. | 701/113 |
| 7,614,383 B2 * | 11/2009 | Werner | 123/295 |

(Continued)

FOREIGN PATENT DOCUMENTS

| | | | |
|---|---|---|---|
| EP | 1591658 A2 | 11/2005 | |
| EP | 1659285 A2 | 5/2006 | |

OTHER PUBLICATIONS

Gibson. Alex O'Connor, "Method for Starting an Engine", U.S. Appl. No. 12/707,567, filed Feb. 17, 2010, FGT093071UO2, 38 pages.

(Continued)

*Primary Examiner* — Stephen K Cronin
*Assistant Examiner* — David Hamaoui
(74) *Attorney, Agent, or Firm* — Julia Voutyras; Alleman Hall McCoy Russell & Tuttle LLP

(57) ABSTRACT

A method for improving starting of an engine that may be repeatedly stopped and started is presented. In one embodiment, the method controls a transition from split fuel injection timing during an engine start to single event fuel injection during idle speed or engine torque control modes. The method better manages vehicle launch performance when the engine is restarted while coupled to an automatic transmission that is in gear.

5 Claims, 6 Drawing Sheets

(56) References Cited

U.S. PATENT DOCUMENTS

| | | | |
|---|---|---|---|
| 7,827,975 B1* | 11/2010 | Gibson et al. | 123/636 |
| 7,866,303 B2* | 1/2011 | Storhok et al. | 123/491 |
| 2004/0100221 A1* | 5/2004 | Fu | 318/700 |
| 2005/0005901 A1* | 1/2005 | Kufferath et al. | 123/299 |
| 2005/0066939 A1* | 3/2005 | Shimada et al. | 123/431 |
| 2007/0068485 A1* | 3/2007 | Hilditch | 123/299 |
| 2008/0196695 A1* | 8/2008 | Storhok et al. | 123/478 |
| 2008/0196696 A1* | 8/2008 | Storhok et al. | 123/491 |
| 2008/0228383 A1 | 9/2008 | Nakagawa et al. | |
| 2010/0288235 A1* | 11/2010 | Miller et al. | 123/464 |

OTHER PUBLICATIONS

Gibson. Alex O'Connor, "Methods and Systems for Assisted Direct Start Control", U.S. Appl. No. 12/707,570, filed Feb. 17, 2010, FGT093070, 32 pages.

\* cited by examiner

METHOD FOR STARTING AN ENGINE

FIELD

The present description relates to a system for improving starting of an engine. The method may be particularly useful for engines that are often stopped and then restarted.

BACKGROUND AND SUMMARY

Vehicle fuel economy may be improved by selectively stopping and starting the engine of a vehicle. An engine may be stopped while the vehicle is in heavy stop-and-go traffic or at stop lights, for example. Stop/start vehicles were initially introduced in manual transmission vehicles because few controls were required beyond the capability to sense a driver's foot on a clutch pedal and the gear shift position. In such systems, the operator controlled the vehicle launch after an engine start by releasing the brake and engaging first gear and the clutch. This arrangement allowed an engine controller to concentrate on controlling the engine in specific modes (e.g., start mode, idle speed control mode or engine torque control mode) while the driver controlled wheel torque by way of the manual clutch.

Recently, however, start/stop engine operation has been proposed for engines coupled to automatic transmissions. Starting of an engine coupled to an automatic transmission may be initiated while the vehicle is in gear. In such vehicles, the operator has less capacity to control the amount of engine torque that is transmitted to vehicle wheels when the engine is restarted in gear as compared to manual transmission vehicles because the driver may not have direct control over transmission clutches. Further, accurate engine speed control during engine starts may be desirable so that speed dependant torque transfer characteristics of a torque converter coupled to the engine crankshaft and transmission input may have less affect on wheel torque, thereby improving vehicle launching. Consequently, an engine controller may be assigned more authority over engine control modes (e.g., start mode, idle speed mode or engine torque control mode) and the amount of engine torque that is transmitted to vehicle wheels. Nevertheless, it may still be desirable for an engine controller to respond to driver inputs during an engine start so that the driver's intentions may be followed. For example, it may be desirable to provide additional torque to vehicle wheels and transition directly from start mode to torque control mode, thereby bypassing idle speed control mode when a driver immediately depresses the throttle after releasing the brake pedal. Thus, there is a need for a method to control engine speed and torque of a stop/start vehicle while also responding to driver demands.

The inventors herein have recognized the above-mentioned disadvantages and have developed a method for improving engine starting. In one embodiment of the present description, a method for starting an engine and controlling engine speed is described. The method comprising: automatically starting an engine; injecting fuel into at least one cylinder during the automatic start, the injection of fuel during a cycle of a cylinder and comprising a first injection and a second injection; and transitioning to injecting fuel once during a cycle of the cylinder in response to a pressure of an intake manifold when a speed of the engine exceeds a threshold.

Engine starting can be improved by transitioning between engine control modes in response to engine speed and intake manifold pressure. In particular, during a start of an engine coupled to an automatic transmission that is in gear, fuel injection mode may be controlled to regulate engine torque in response to manifold pressure when engine speed exceeds a threshold. For example, if during an engine restart, an operator does not immediately depress an accelerator pedal, the engine speed may reach a desired speed before intake manifold pressure drops below a desired level. A split injection during this period may lower the combustion torque and improve engine combustion stability at these reduced combustion torque levels. However, once the intake manifold pressure drops below a desired level, fuel injection may be transitioned to a single injection mode where engine speed and torque may be controlled by way of spark or air flow throttling.

The present description may provide several advantages. Specifically, the approach may improve engine speed control for an engine that is coupled to an automatic transmission and that is started while in gear because the approach may provide improved engine torque control robustness and combustion at lower engine torque levels, than was previously available with conventional single fuel injection methods during an engine start. Further, the approach may reduce engine emissions after the engine operates in a stable combustion mode. Further still, the approach may provide improved transitions between engine modes at engine start by considering engine operating conditions beyond engine speed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION OF THE DRAWINGS

Automatically restarting of an engine may be particularly challenging for engines equipped with automatic transmissions. The engine of FIG. 1 may be started by the methods of FIGS. 5 and 6 as illustrated by starting sequences of FIGS. 2-4 to improve starting of an engine coupled to an automatic transmission. The systems and methods described herein may offer improved engine speed control during starting so that an engine may be restarted when a transmission coupled to the engine is engaged in a drive gear without sending an undesirable amount of engine torque to the vehicle wheels.

Figure 1:
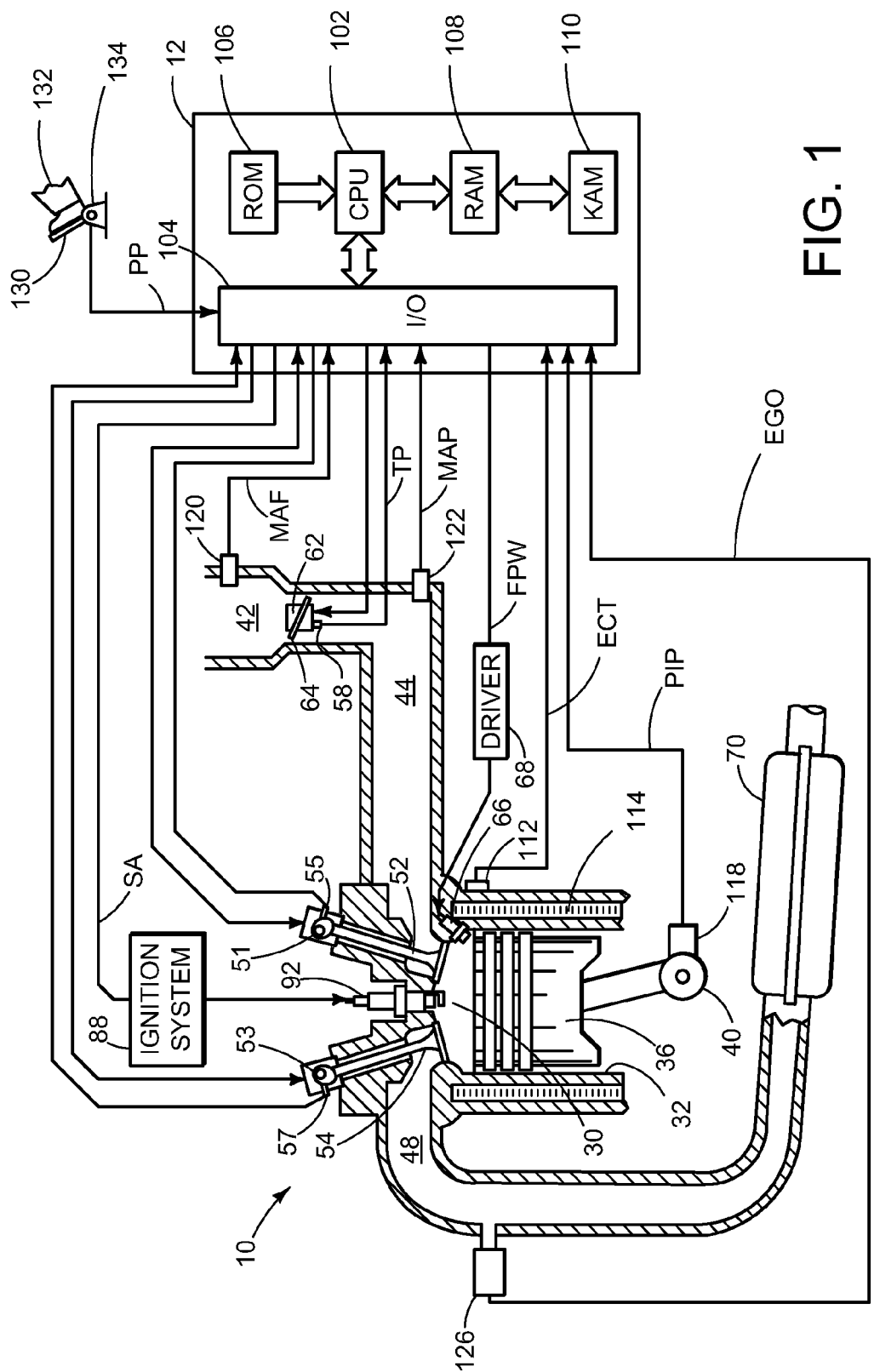
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 which controls the position of throttle plate 64. Air may enter intake manifold 44 from air inlet 42 by way of throttle plate 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Engine 10 may be coupled to an automatic or manual transmission (not shown) to deliver engine torque to vehicle wheels. In an alternative embodiment, engine 10 may be part of a hybrid driveline.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Fuel rail pressure and barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, engine crankshaft 40 may be rotated by a starter or by a motor of a hybrid vehicle to assist engine starting.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-directional Hall sensor or equivalent, the engine position may be maintained through shut-down, but during re-start alternative strategy may be used to assure that the engine is rotating in a forward direction.

Figure 2:
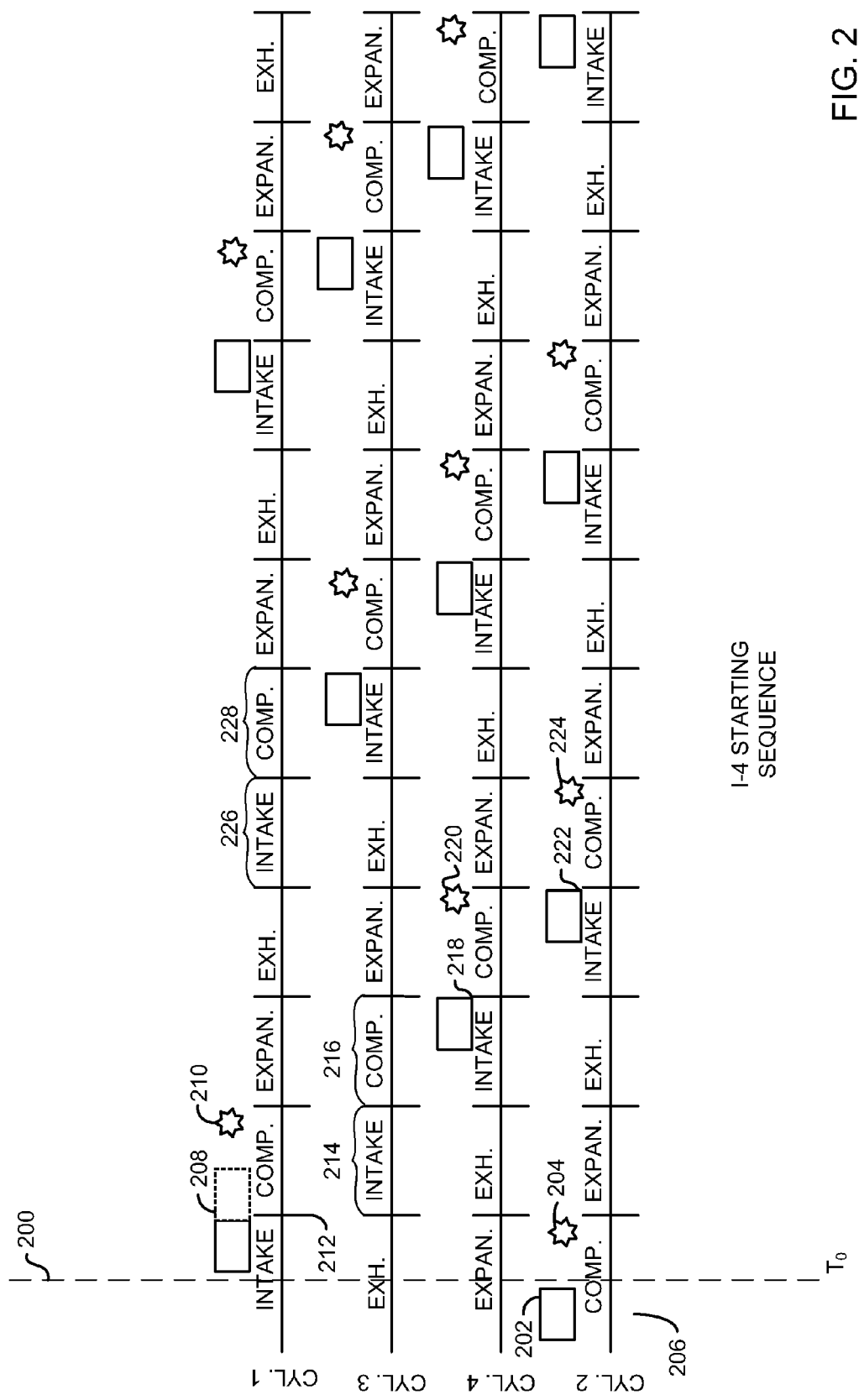
FIG. 2 is an example plot of a simulated engine start sequence.
Figure 3:
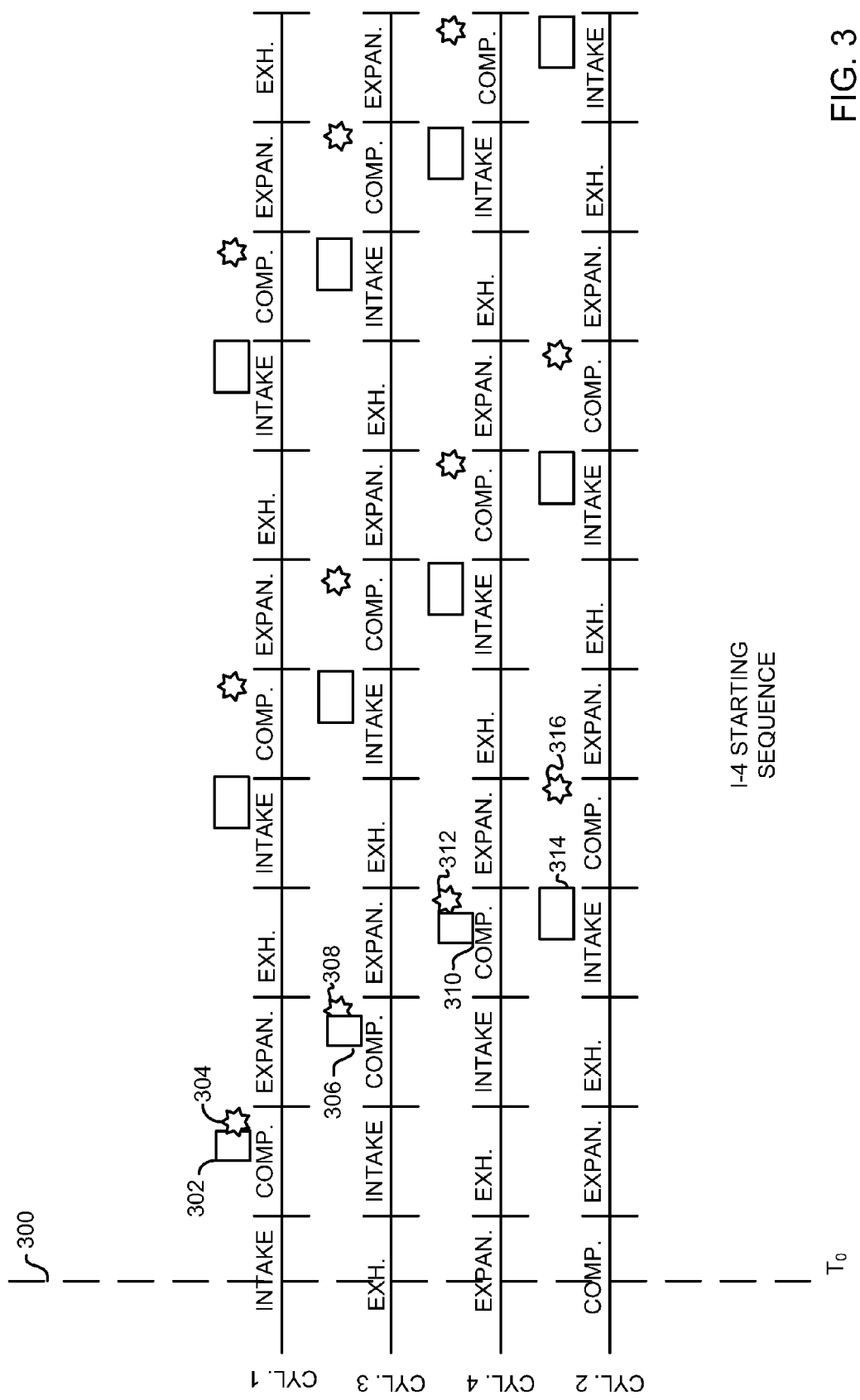
FIG. 3 is an example plot of an alternative engine start sequence.
Figure 4:
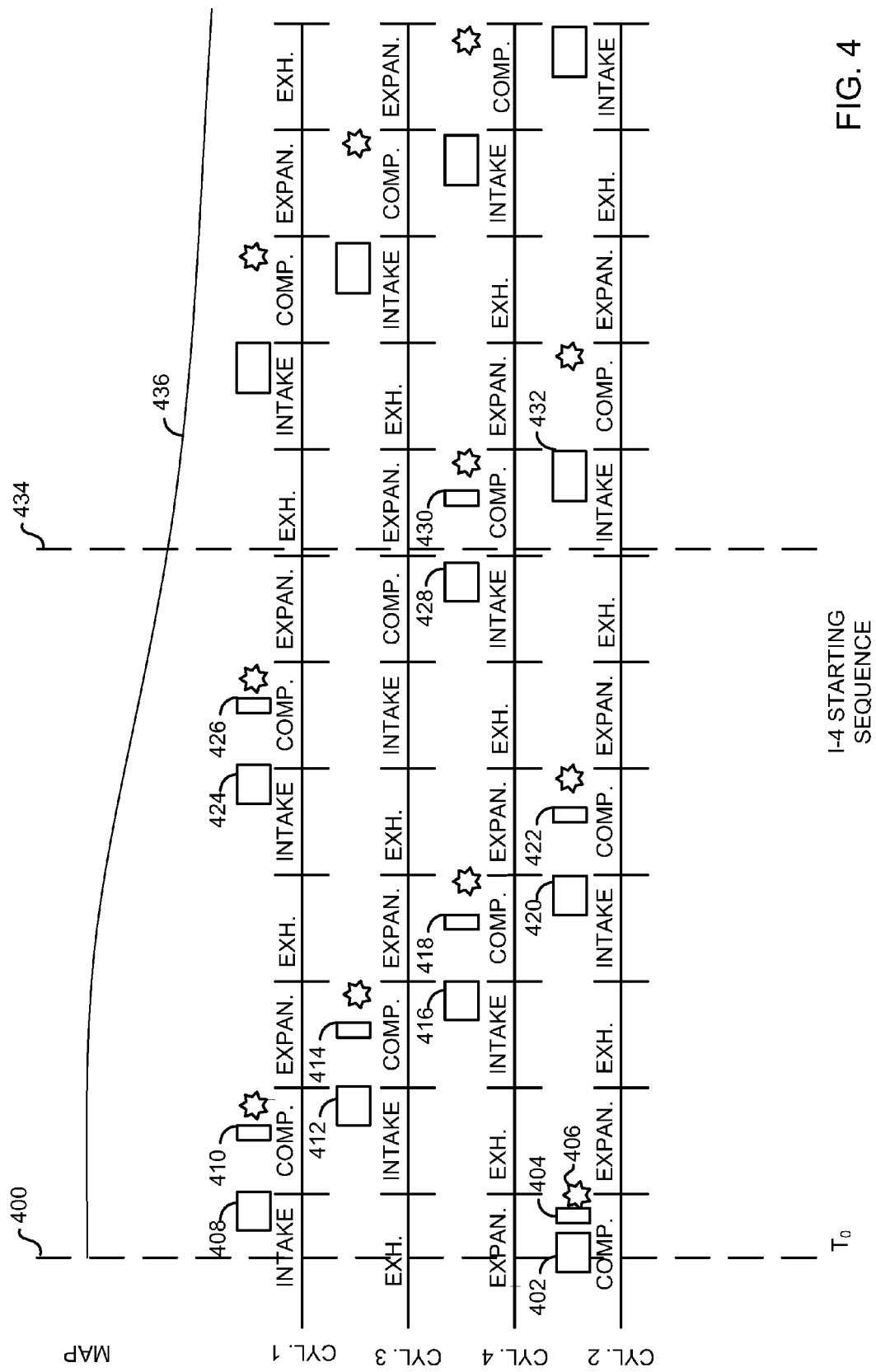
FIG. 4 is an example of a simulated alternative engine start sequence.
Figure 5:
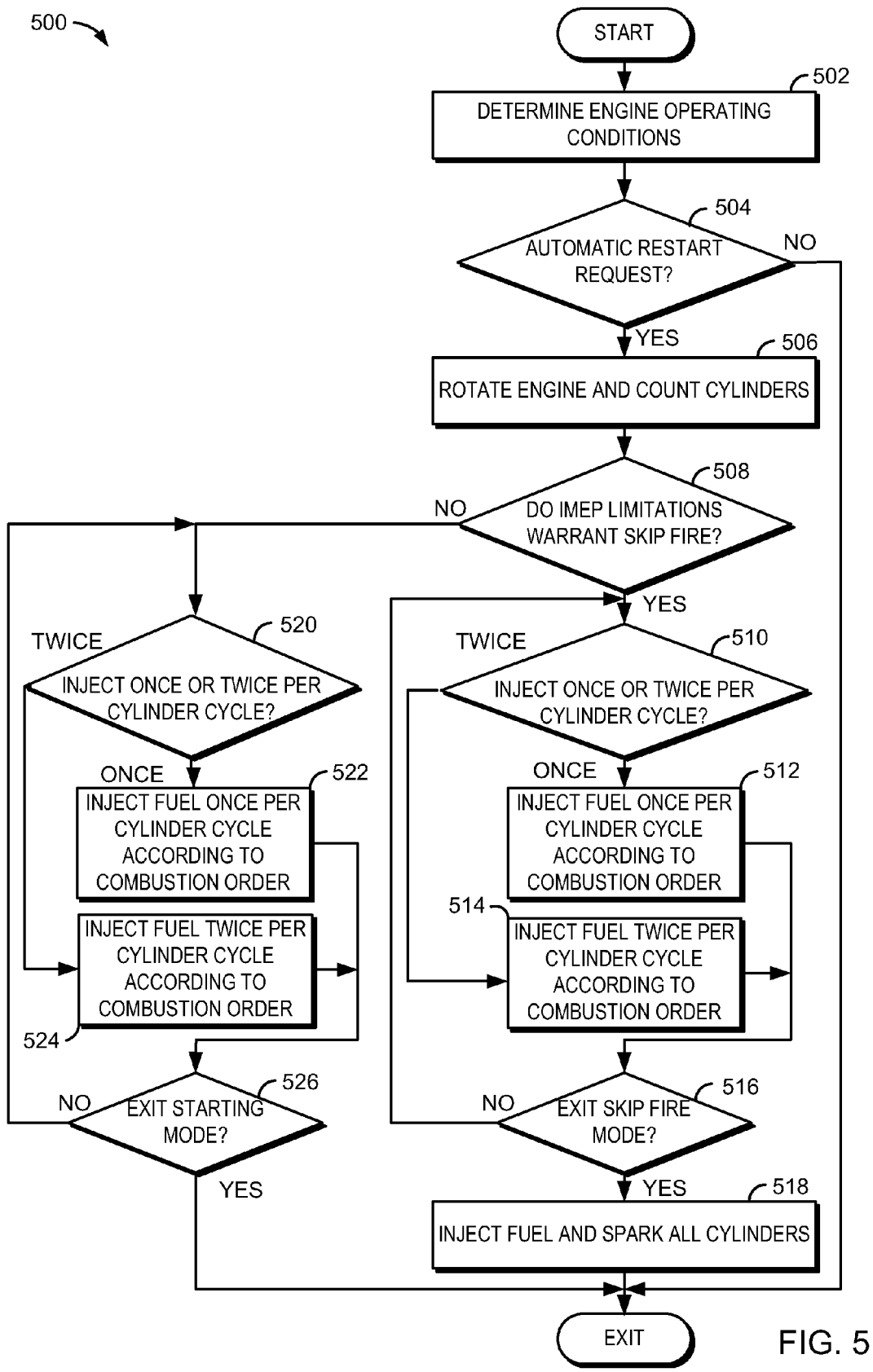
FIG. 5 is a flow chart of an engine starting routine.

Referring to FIG. 2, an example plot of a simulated engine start sequence by the method of FIG. 5 is shown. In particular, events of interest for starting a four-stroke four cylinder engine are shown. Vertical marker 200 represents a reference to time $T_O$. At $T_O$, and to the left of $T_O$, the engine is not rotating and may be referenced by time. Right of $T_O$, the engine is rotating as time increases to the right. Engine events (e.g., fuel injection timing and spark) are illustrated with respect to engine position as the engine rotates through an engine cycle. As the engine accelerates the time for an engine stroke decreases, but the engine stoke remains constant in terms of crankshaft angular degrees. FIGS. 2-4 illustrate engine events in terms of engine strokes; therefore, the time scale of engine events may change but the crankshaft angular distance remains constant as shown in FIGS. 2-4.

The engine position of each cylinder of a four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

At $T_O$, the engine is stopped on the intake stroke of cylinder number 1, the exhaust stroke of cylinder number 3, the expansion stroke of cylinder number 4, and the compression stroke of cylinder number 2. In this example, fuel is injected to cylinder number 2 while the engine is not rotating during a compression stroke. Injecting before engine rotation and during the compression stroke increases the possibility that the engine will start earlier. In this example, the first fuel injection is identified by the injection window indicated at marker 202. The injection window illustrated is illustrated by a box and is an amount of time necessary to inject the desired amount of fuel into the cylinder, although the injection timings illustrated are exemplary in nature only and are not indicative of any particular amount of fuel to be injected. As can be seen from FIG. 2, the first amount of fuel injected into cylinder number 2 is injected in a single injection. However, two or more separate injections of fuel into the cylinder to first receive fuel since engine stop is possible. Further, in some embodiments, fuel may be injected to the first cylinder to receive fuel after engine stop after the engine begins to rotate.

A cylinder counter is also started at $T_O$. The cylinder counter counts the number of cylinder events from engine stop. The cylinder counter begins counting at the cylinder to first receive fuel and continues incrementing with each cylinder that rotates through bottom-dead-center intake stroke. For example, the cylinder counter increments to a value of one at time of first injection at marker 206. The cylinder counter is incremented again, this time to a value of two at 212, and so on as the engine continues to rotate. In alternative embodiments the cylinder counter may be incremented at different engine positions or by different events. For example, the cylinder counter may be incremented at ten degrees after the beginning of each cylinder intake stroke.

As the engine rotates, combustion in cylinder number 2 is initiated by a spark at 204; however, in some embodiments, a spark may be initiated before engine rotation, thereby inducing engine rotation before or while the starter is engaged. While cylinder number 2 is on a compression stroke, cylinder number 1 is on an intake stroke. Fuel may be injected during the intake stroke of cylinder number 1 and/or during the compression stroke as illustrated by the dashed lines of the injection window 206. Combustion is initiated in cylinder number 1 at 210 as indicated by the spark 210.

At intake stroke 214 and compression stroke 216, no fuel is injected nor is spark provided to the next cylinder in the combustion order, cylinder number 3. No fuel is injected after the cylinder counter reaches a value of two until the counter reaches a value of three at which time fuel injection and spark resume at 218 and 220 respectively. Fuel is again injected at 222 and 224 while the cylinder counter value is four. Injection and spark are stopped again during intake stroke 226 and 228 when the cylinder counter value is five. An engine operating in this manner may be referred to as operating in skip mode combustion.

Thus, in the example of FIG. 2, the cylinder counter counts the number of cylinders having rotated through and intake stroke in the order of combustion (e.g. 1-3-4-2), the engine controller injects fuel and initiates spark for two cylinders in order of combustion, the engine controller skips injecting fuel and initiating spark for one cylinder in the order or combustion, the engine controller resumes fuel injection and initiation of spark for two cylinders in the order of combustion, and then the engine controller skips injecting fuel and initiating spark for another cylinder in the order of combustion. However, it should be noted that the order and sequence illustrated by FIG. 2 is only exemplary in nature and not intended to limit the scope of the description. For example, in some embodiments three cylinders may combust an air-fuel mixture before combustion is skipped in a cylinder. In other embodiments, four cylinders may combust an air-fuel mixture before combustion is skipped in a cylinder. In other embodiments, combustion may be skipped in two cylinders in a row rather than one as depicted by FIG. 2.

After skipped injection and spark at 226 and 228, FIG. 2 shows fuel injection is resumed on a continuous basis. Although the depicted method is effective to control engine speed so that the possibility of overshooting idle speed is reduced, the present method may be used to control engine idle speed for a longer duration, if desired. For example, skip mode combustion may be executed for an predetermined number of cylinder cycles or engine cycles after an engine stop before all cylinders are continuously combusting air-fuel mixtures.

Turning now to FIG. 3, an example plot of an alternative engine start sequence by the method of FIG. 5 is shown. Similar to FIG. 2, events of interest for starting a four-stroke four cylinder engine are shown. Vertical marker 300 represents a reference to time $T_O$. At $T_O$, and to the left of $T_O$, the engine is not rotating and may be referenced by time. Right of $T_O$, the engine is rotating as time increases to the right.

The engine position of each cylinder of a four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

The engine position at engine stop, time left of $T_O$, is the same as illustrated by FIG. 2. However, during this example engine start, fuel is not injected while the engine is not rotating. The first fuel injection occurs after the engine begins to rotate to the right of $T_O$ at 302. The first spark event is at 304. Similar to FIG. 2, the injection window is illustrated by a box and is an amount of time necessary to inject the desired amount of fuel into the cylinder.

A cylinder counter similar to the one described in FIG. 2 is started at $T_O$. The cylinder counter counts the number of cylinder events from engine stop. The cylinder counter begins counting at the cylinder to first receive fuel after an engine stop and continues incrementing with each cylinder that rotates through a particular position, bottom-dead-center intake stroke for example.

The fuel injection amounts of the first three fuel injections 302, 306, and 310 occur late in the compression stroke and are of a shorter duration than the fuel injection of the fourth cylinder to receive fuel at 314. The injection timing is late in the compression stroke and shorter in duration in order to facilitate lean stratified combustion for the first three cylinder combustion events. Injecting late in the compression stroke allows a richer mixture to develop around the spark plug just before spark is initiated so that the air-fuel mixture ignites even though the amount of fuel injected into the cylinder may not support combustion if the air-fuel mixture in the cylinder was homogenous. By combusting a stratified mixture for the first few combustion events, it may be possible to generate less engine torque, thereby reducing engine torque so that engine speed does not exceed a desired level during and engine start and run-up (e.g., the portion of an engine start when the engine is accelerating from crank speed until idle speed is reached).

In one embodiment, the number of stratified lean combustion events may be predetermined and stored in memory of an engine controller. Thus, for the example of FIG. 3, stratified lean combustion is programmed for three combustion events. The fourth combustion event at 316, is a homogenous combustion event based on the intake stroke fuel injection at 314. Thus, it may be possible to control engine speed during a start by performing stratified lean combustion and transitioning to homogenous combustion after a predetermined number of cylinder or combustion events. After fuel injection at 314, all engine cylinders continue to combust homogenous mixtures; however, it is possible to operate a fraction of engine cylinders in a stratified lean combustion mode if desired.

Figure 6:
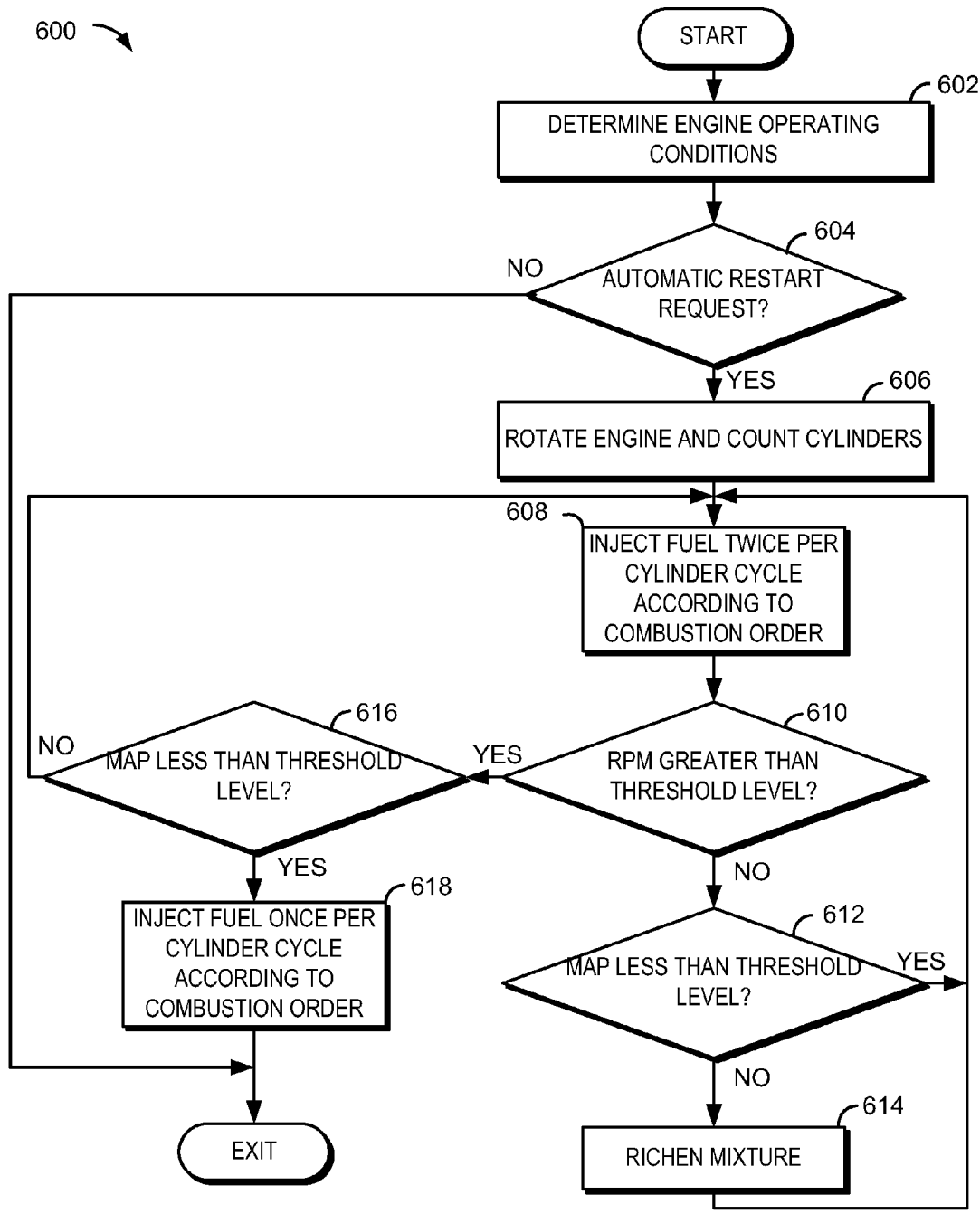
FIG. 6 is a flow chart of an alternative engine starting routine.

Referring now to FIG. 4, an example plot of an alternative engine start sequence by the method of FIG. 6 is shown. Similar to FIGS. 2 and 3, events of interest for starting a four-stroke four cylinder engine are shown. Vertical marker 400 represents a reference to time $T_O$. At $T_O$, and to the left of $T_O$, the engine is not rotating and may be referenced by time. Right of $T_O$, the engine is rotating as time increases to the right.

The engine position of each cylinder of a four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

The engine position at engine stop, time left of $T_O$, is the same as illustrated by FIGS. 2-3. The first fuel injection is shown as partially injected at engine stop and continues as the engine begins to rotate to the right of $T_O$ at 402. However, the first injection event may occur at engine stop or after the engine begins to rotate. The first spark event occurs at 406. In this example, there are two fuel injection events 402 and 404 during the first cycle of the first cylinder since engine stop to receive fuel injection. Similar to FIGS. 2 and 3, the injection windows are illustrated by boxes and are an amount of time necessary to inject the desired amount of fuel into the cylinder. The first two injection events occur during the compression stroke of cylinder number 2. Injecting twice during the compression stroke may reduce engine starting time and may improve combustion stability for the first cylinder to fire (e.g., combust an air-fuel mixture).

A cylinder counter similar to the ones described in FIGS. 2 and 3 is started at $T_O$. The cylinder counter counts the number of cylinder events from engine stop. The cylinder counter begins counting at the cylinder to first receive fuel since engine stop and continues incrementing with each cylinder that rotates through a particular position, bottom-dead-center intake stroke for example.

After fuel is injected twice for the first cylinder since engine stop and during the compression stroke at 402 and 404, fuel is injected twice each cylinder cycle to the remaining cylinders in the engine combustion order at 408-430. After vertical marker 434, the cylinders transition to a single injection of fuel beginning at 432.

Intake manifold pressure (MAP) during the engine start is indicated by trace 436. When the engine is started, MAP is at atmospheric pressure because air enters the intake system at engine stop by passing through the throttle body and entering the intake manifold. As the engine begins to rotate, air in the intake manifold is drawn into cylinders, thereby reducing the intake manifold pressure. The intake manifold pressure stabilizes after the engine reaches idle speed.

Vertical marker 434 indicates engine conditions when engine speed is above a threshold speed and when manifold pressure is below a threshold. In this example, engine speed is greater than the threshold speed before MAP is below a threshold MAP. Thus, vertical marker 434 indicates a threshold MAP for this engine start. The threshold MAP may vary with operating conditions. For example, threshold MAP may lower as ambient altitude increases. Conversely, threshold MAP may increase as ambient altitude decreases. As indicated by FIG. 4, fuel injection is transitioned from injecting twice per cylinder cycle before 434, to injecting once per cylinder cycle after 436. Fuel is transitioned from two injections per cylinder cycle, which may improve combustion stability, to one injection per cylinder cycle to reduce engine emissions. A single fuel injection during the intake stroke of a cylinder may improve engine emissions because fuel mixing may be improved by injecting once during an intake stroke.

Referring now to FIG. 5, a flow chart of an engine starting routine is shown. At 502, routine 500 determines engine operating conditions. Engine operating conditions may include but are not limited to engine coolant temperature, fuel type or percent ethanol, fuel rail pressure, ambient temperature and pressure, transmission gear position, transmission oil temperature, engine throttle position, accelerator pedal position, and brake pedal position. The various engine operating conditions may be directly sensed or inferred from a combination of sensors for example.

At 504, routine 500 judges whether or not there is an automatic engine restart request. In one example, an engine start request may be generated after a vehicle is automatically stopped in response to vehicle speed below a threshold speed and a depressed brake pedal. The automatic engine start request may be generated by the operator releasing the vehicle brake pedal or engaging/releasing the clutch pedal or when the accelerator pedal is depressed. In other examples, an automatic start request may be generated by a hybrid controller for example. An automatic start request may be generated for a vehicle with an automatic transmission or a manual transmission. If the engine is coupled to an automatic transmission, the transmission may be in a drive gear or in park or neutral. If an automatic engine restart is requested routine 500 proceeds to 506. Otherwise, routine 500 proceeds to exit.

At 506, fuel may be injected into a cylinder that is on a compression stroke before the engine rotates. However, if the engine is not in a position desirable for starting, fuel injection may be delayed until the engine begins to rotate.

At engine stop, a cylinder counter is set to a value of zero. In one example, the cylinder counter may be incremented by the first instance of fuel injection and as each cylinder passes though a bottom-dead-center intake stroke position. In other embodiments, the cylinder counter may be incremented at top-dead-center intake stroke of each cylinder or at alternate engine positions. Thus, the cylinder counter is zero while the engine is stopped and increments as the engine begins to rotate moving the respective engine cylinders through the individual cylinder cycles.

Returning to 506, engine rotation begins and cylinder counting is initiated by routine 500. The engine rotation may be accomplished by a starter or by a motor of a hybrid vehicle.

At 508, routine 500 judges whether or not IMEP limitations warrant entering skip fire mode. IMEP may be limited by injector minimum pulse width limitations, ambient environmental conditions, or by other sensor or actuator limitations. In one example, IMEP may be limited by the quantity of air inducted into an engine cylinder, and by the number of engine cylinders. Further, the IMEP limitation may increase as the amount of air held by an engine cylinder increases. For example, engines having a greater number of cylinders and larger cylinder volumes may have higher IMEP limits as compared to engines having fewer cylinders and lower volume cylinders.

In one embodiment, IMEP limitations of an engine may be determined with a dynamometer and stored in memory of a manufactured vehicle. For example, an engine may be operated under various conditions to determine during what conditions cylinder IMEP is greater than a value that allows the engine to operate at a desired idle speed. In one example, an engine may operate at a higher IMEP when ambient air temperature is cold and when engine temperature is warm. The colder ambient air temperatures may increase cylinder air charge such that the cold engine will have a higher torque output. In another example, IMEP may be higher than is desired when a lean air-fuel mixture is desired and when a fuel injector is operating at a minimum pulse width resulting in an engine torque output that is higher than is desired.

When an automatic start request is made under engine operating conditions that were previously determined to result in IMEP higher than desired, routine 500 proceeds to 510. Otherwise, routine 500 proceeds to 520.

At 510, routine 500 judges whether to inject fuel to a cylinder once or twice each cylinder cycle. In one example, fuel may be injected once per cylinder cycle during an engine start when a temperature or fuel rail pressure of the engine is greater than a threshold. In this example, fuel may be injected twice per cylinder cycle during an engine start when a temperature or fuel rail pressure of the engine is less than a threshold. Injecting fuel twice during a cylinder cycle during an engine start may improve combustion stability under some conditions. Whereas, injecting fuel once during a cylinder cycle during an engine start may improve engine emissions.

In another example, fuel may be injected once per cylinder cycle during an engine start when an ambient air pressure is greater than a threshold. In this example, fuel may be injected twice per cylinder cycle during an engine start when an ambient air pressure is less than a threshold.

At 512, routine 500 injects fuel to each cylinder once during the cycle of each of the engine cylinders and in the order of engine combustion. For example, fuel may be injected during the intake stroke of each cylinder of a four cylinder engine in an order of 1-3-4-2. Further, at 512, routine 500 decides which cylinder to prohibit fuel injection to during a cycle of the cylinder in response to a value of the cylinder counter. As a result of prohibiting fuel injection during a cycle of a cylinder, the engine may skip one or more combustion events. In one example, fuel may not be injected to a cylinder when the cylinder counter matches a number stored in memory of an engine controller. Therefore, one or more combustion events may skip combustion before combustion resumes. In another example, fuel may not be injected to a cylinder at predetermined intervals, every third cylinder in the order of engine combustion for example. Thus, as the engine rotates and combusts air-fuel mixtures, the cylinder counter is incremented. When the cylinder counter reaches predetermined numbers, the fuel injection may be temporarily stopped so that engine torque is reduced, thereby controlling engine speed. As mentioned above, the cylinder counter may be incremented at specific cylinder events (e.g., a piston at top-dead-center intake stroke), engine combustion events (e.g., when a spark is initiated), or other instances related to engine position. After 512 is complete, routine 500 proceeds to 516.

At 514, routine 500 injects fuel to each cylinder twice during the cycle of each of the engine cylinders in the order of engine combustion. For example, fuel may be injected twice during the compression stroke of each cylinder of a four cylinder engine in an order of 1-3-4-2. Further, at 514 routine 500 decides which cylinder to prohibit fuel injection to during a cycle of the cylinder in response to a value of the cylinder counter. As a result of prohibiting fuel injection during a cycle of a cylinder, the engine may skip one or more combustion events. In one example, fuel may not be injected to a cylinder when the cylinder counter matches a number stored in memory of an engine controller. Therefore, one or more combustion events may skip combustion before combustion resumes. In another example, fuel may not be injected to a cylinder at predetermined intervals, every third cylinder in order of engine combustion for example. Thus, as the engine rotates and combusts air-fuel mixtures, the cylinder counter is incremented. When the cylinder counter reaches predetermined numbers, the fuel injection may be temporarily stopped so that engine torque is reduced, thereby controlling engine speed. As mentioned above, the cylinder counter may be incremented at specific cylinder events (e.g., a piston at top-dead-center intake stroke), engine combustion events (e.g., when a spark is initiated), or other instances related to engine position. After 514 is complete, routine 500 proceeds to 516.

Note that the error between the desired and actual engine speed may be determined on a cylinder event by cylinder event basis, same as the event counter, and can also be used to determine when to skip a cylinder combustion event or to not skip a cylinder combustion event. Emissions implications may also be considered. For example, an engine may be limited to a predetermined number of skipped combustion events each engine start. Further, a monitor of the number of skipped combustion events or a ratio of skipped combustion events over firing events may be provided to determine when to exit skip mode combustion.

At 516, routine 500 judges whether or not to exit skip fire mode. In one embodiment, skip fire mode may be exited when the cylinder counter reaches a predetermined number since engine stop. For example, skip fire mode may be exited after a predetermined number of cylinder events or combustion events since engine stop. In another example, skip fire mode may be exited after a predetermined amount of time or after an operator input for additional engine torque. For example, routine 500 may transition out of skip fire mode when an operator depresses an accelerator pedal. If routine 500 judges to exit skip fire mode, routine 500 proceeds to 518. Otherwise, routine 500 returns to 510.

At 518, routine 500 exits skip fire mode by continuously injecting fuel to cylinders and by providing spark to each cylinder in order of engine combustion order. Further, engine speed may be controlled by adjusting spark or reducing cylinder air charge after exiting skip fire mode. After 518, routine 500 exits.

At 520, routine 500 judges whether to inject fuel to a cylinder once or twice each cylinder cycle. In one example, fuel may be injected once per cylinder cycle during an engine start when a temperature or fuel rail pressure of the engine is greater than a threshold. In this example, fuel may be injected twice per cylinder cycle during an engine start when a temperature or fuel rail pressure of the engine is less than a threshold. Injecting fuel twice during a cylinder cycle during an engine start may improve combustion stability under some conditions. Whereas, injecting fuel once during a cylinder cycle during an engine start may improve engine emissions.

In another example, fuel may be injected once per cylinder cycle during an engine start when an ambient air pressure is greater than a threshold. In this example, fuel may be injected twice per cylinder cycle during an engine start when an ambient air pressure is less than a threshold.

At 522, routine 500 injects fuel to each cylinder once during the cycle of each of the engine cylinders and in the order of engine combustion. In one embodiment, the engine may be started with a lean air-fuel mixture as is described by FIG. 3. In particular, the engine may be started by injecting fuel during the compression stroke to form a stratified mixture near or around the spark plug just prior to initiating a spark event. Further, the engine may be operated stratified lean for a predetermined number of cylinder events or combustion events since engine stop.

In one embodiment, engine cylinders are operated with lean air-fuel mixtures according to the order of combustion until the cylinder counter reaches a predetermined number. Further, the predetermined number may be varied in response to engine operating conditions. For example, the engine may operate lean for twenty combustion events when engine temperature is near 20° C. and for three events when engine temperature is near 90° C. Thus, as the engine rotates and combusts air-fuel mixtures, the cylinder counter is incremented. After 522, routine 500 proceeds to 526.

At 524, routine 500 injects fuel to each cylinder twice during the cycle of each of the engine cylinders in the order of engine combustion. For example, fuel may be injected twice during the compression stroke of each cylinder of a four cylinder engine in an order of 1-3-4-2. After 524, routine 500 proceeds to 526.

At 526, routine 500 judges whether or not to exit start mode. In one embodiment, start mode may be exited when the cylinder counter reaches a predetermined number since engine stop. For example, start mode may be exited after a predetermined number of cylinder events or combustion events since engine stop. In another example, start mode may be exited after a predetermined amount of time or after an operator input for additional engine torque or if the intake manifold pressure drops below a specified threshold pressure. For example, routine 500 may transition out of start mode when an operator depresses an accelerator pedal. If routine 500 judges to exit start mode, routine 500 proceeds to exit. Otherwise, routine 500 returns to 520.

Referring now to FIG. 6, a flow chart of an alternate engine starting routine is shown. At 602, routine 600 determines engine operating conditions. Engine operating conditions may include but are not limited to engine coolant temperature, fuel type or percent ethanol, fuel rail pressure, ambient temperature and pressure, transmission gear position, transmission oil temperature, engine throttle position, accelerator pedal position, and brake pedal position. The various engine operating conditions may be directly sensed or inferred from a combination of sensors for example.

At 604, method 600 judges whether or not there is an automatic engine restart request. In one example, an engine start request may be generated after a vehicle is automatically stopped in response to vehicle speed below a threshold speed and a depressed brake pedal. The automatic engine start request may be generated by the operator releasing the vehicle brake pedal or when the accelerator pedal is depressed. In other examples, an automatic start request may be generated by a hybrid controller for example. Further, in one embodiment, the engine may be restarted when there is lack of operator input to an engine torque demand input.

An automatic start request may be generated for a vehicle with an automatic or manual transmission. If the engine is coupled to an automatic transmission, the transmission may be in a drive gear or in park or neutral.

In one embodiment, fuel may be injected to one or more cylinders on a compression stroke in response to a request for an automatic start. Further, the injection may continue as the engine begins to rotate in response to the request to automatically start the engine. If an automatic engine restart is requested routine 600 proceeds to 606. Otherwise, routine 600 proceeds to exit.

At engine stop, a cylinder counter is set to a value of zero. In one example, the cylinder counter may be incremented by the first instance of fuel injection and as each cylinder passes though a bottom-dead-center intake stroke position. In other embodiments, the cylinder counter may be incremented at top-dead-center intake stroke of each cylinder or at alternate engine positions. Thus, the cylinder counter is zero while the engine is stopped and increments as the engine begins to rotate moving the respective engine cylinders through the individual cylinder cycles.

Returning to 606, engine rotation begins and cylinder counting is initiated by routine 600. The engine rotation may be accomplished by a starter or by a motor of a hybrid vehicle.

At 608, routine 600 injects fuel to each cylinder twice during the cycle of each of the engine cylinders in the order of engine combustion. For example, fuel may be injected twice during the compression stroke of each cylinder of a four cylinder engine in an order of 1-3-4-2. Further, fuel may be injected twice during the compression stroke of each engine cylinder for a predetermined number of cylinder events or combustion events and then fuel may be injected twice, one injection during the intake stroke of a cylinder, the second injection during the compression stroke of the cylinder. In this way, the engine may be started by injecting twice during a compression stroke a predetermined number of times and then transitioned into injecting fuel twice during a cylinder cycle for each engine cylinder, the first injection during the intake stroke and the second injection during the compression stroke. In addition, the amount of fuel may be varied depending on a temperature of the engine and on the MAP. It should be noted that a third injection of fuel during a cycle of a cylinder during an engine start is also possible. Routine 600 proceeds to 610 after the fuel delivery method has been selected and commanded such that fuel is injected twice per cylinder cycle for the respective cylinders.

At 610, routine 600 judges whether or not engine speed is greater than a threshold amount while fuel is injected twice during a stroke of the respective cylinders. Routine 600 judges whether engine speed is greater than a threshold as a condition to establish that fuel injection can be transitioned from a fuel injection method that may improve combustion stability to a fuel injection method that may improve engine emissions. Further, the engine speed threshold may vary for depending on engine operating conditions. For example, as a temperature or fuel rail pressure of the engine increases the engine speed threshold may decrease. If engine speed exceeds a predetermined threshold, the threshold varying with engine operating conditions, routine 600 proceeds to 616. Otherwise, routine 600 proceeds to 612.

At 612, routine 600 judges whether or not engine MAP is less than a threshold amount while fuel is injected twice during a stroke of the respective cylinders. Routine 600 judges whether MAP is less than a threshold to determine if the engine may be misfiring. If MAP is not less than a threshold, routine 600 proceeds to 614 and fuel is enriched to improve the possibility of stable combustion during engine start. Otherwise, routine 600 returns to 608.

At 614, routine 600 richens the air-fuel mixtures of engine cylinders to reduce the possibility of misfires. When the engine is not misfiring, engine speed increases and the intake manifold pressure is reduced. However, if an engine cylinder misfires, engine speed may be reduced such that less air may be drawn from the intake manifold resulting in higher intake manifold pressure. The amount of fuel injected to engine cylinders is increased at 614 to reduce the possibility of engine misfire.

At 616, routine 600 judges whether or not engine MAP is less than a threshold level. Engine MAP may be one indication of engine starting robustness. If the intake manifold pressure is pumped down as expected, the engine may be at an operating condition that is stable enough to transition to a fuel injection method that may improve engine emissions. Therefore, routine 600 judges whether or not MAP is less than a threshold. If MAP is less than a threshold, routine 600 proceeds to 618. Otherwise, routine 600 returns to 608 where the engine continues combusting air-fuel mixtures that include two separate injections of fuel during the respective cylinder cycles as shown in FIG. 4, for example.

At 618, routine 600 transitions to injecting fuel once to each of the respective cylinders during a cylinder cycle. Fuel injected once per cylinder cycle may improve engine emissions during an engine start. FIG. 4. shows a representative transition from injecting twice per cylinder cycle into each cylinder to injecting once per cylinder cycle into each cylinder. Specifically, after 434 of FIG. 4, fuel is injected once per cylinder cycle for a cylinder that has not started an injection cycle (e.g., an injection cycle may be an injection period to inject all fuel for a single combustion event during a single cylinder cycle).

At 618, routine 600 transitions fuel injection according to the engine combustion order. For example, as shown in FIG. 4, the last cylinder to begin receiving fuel before MAP is less than a threshold level at 434 is cylinder number 4 at 428. Cylinder number 4 receives the balance of the cylinder mixture at 430, and then, fuel injection is transitioned to single fuel injection per cylinder cycle in the order of combustion. Since cylinder number 2 is next in the order of engine combustion, cylinder number 2 is the first cylinder since engine stop to receive fuel once per cylinder cycle. Cylinders 1, 3, and 4 follow cylinder number 2 transitioning to one injection event per cylinder cycle. Routine 600 exits once all cylinders have transitioned to one fuel injection to each cylinder during a cylinder cycle.

The routine of FIG. 600 may also limit the entry into a torque control mode until a predetermined number of cylinder events or combustion events have occurred after an engine stop. In one example, routine 600 may proceed from 618 to a state where fuel injection and operating mode are restricted from entering an engine torque control mode until a specific predetermined number of combustion events are detected or until an operator torque request is made. This restriction may improve the possibility that the engine responds as desired when the engine enters an engine torque control mode.

It should be noted that in the examples of FIGS. 2-4, the engine may be coupled to an automatic transmission, but these methods of engine starting may be appropriate for an engine coupled to a manual transmission. Further, the present examples may be appropriate for starting and engine coupled to an automatic transmission while the transmission is in a drive gear, but the present methods may also be used to start an engine that is in neutral or park. Further still, the engine starting position of each example is shown merely for illustration purposes. The methods illustrated may be applied at different engine starting positions and to engines having additional or fewer cylinders.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting an engine, comprising:
stopping the engine;
automatically starting the engine in response to a condition;
in a first mode, injecting fuel to at least one cylinder during the automatic start, the injection of fuel during a cycle of a cylinder and comprising a first injection and a second injection, and transitioning to injecting fuel once during a cycle of the cylinder in response to intake manifold pressure less than a threshold pressure and an engine speed greater than a threshold speed during the automatic starting of the engine; and
in a second mode, injecting fuel to at least one cylinder during the automatic start, the injection of fuel during a cycle of the cylinder and comprising a first injection and a second injection, and richening an air-fuel mixture of the at least one cylinder in response to the intake manifold pressure being not less than the threshold pressure and in response to the engine speed being less than the threshold speed during the automatic starting of the engine.

2. The method of claim 1, wherein an automatic transmission is coupled to the engine and wherein the automatic transmission is in a drive gear during the automatic starting of the engine.

3. The method of claim 2, wherein the condition is an operator releasing a vehicle brake.

4. The method of claim 3, further comprising prohibiting fuel injection to one cylinder during a cycle of the one cylinder in response to counted cylinder cycles while injecting fuel twice during cycles of other engine cylinders in the first mode.

5. The method of claim 3, further comprising limiting entry into an engine torque control mode until a predetermined number of combustion events have occurred after the engine stop.

* * * * *